(12) United States Patent
Sato et al.

(10) Patent No.: US 8,801,390 B2
(45) Date of Patent: Aug. 12, 2014

(54) FAN CONTROL SYSTEM AND AIR CONDITIONER THAT INCLUDES THE SAME

(75) Inventors: Toshiaki Sato, Kusatsu (JP); Hiroshi Doumae, Sakai (JP); Sumio Kagimura, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 523 days.

(21) Appl. No.: 12/600,234

(22) PCT Filed: May 20, 2008

(86) PCT No.: PCT/JP2008/059177
§ 371 (c)(1),
(2), (4) Date: Nov. 13, 2009

(87) PCT Pub. No.: WO2008/143231
PCT Pub. Date: Nov. 27, 2008

(65) Prior Publication Data
US 2010/0226792 A1 Sep. 9, 2010

(30) Foreign Application Priority Data
May 22, 2007 (JP) ................. 2007-135038

(51) Int. Cl.
| F04B 49/06 | (2006.01) |
| F04B 35/04 | (2006.01) |
| H02P 7/00 | (2006.01) |
| H02P 3/00 | (2006.01) |
| H02P 5/00 | (2006.01) |
| H02P 5/46 | (2006.01) |

(52) U.S. Cl.
USPC ......... 417/44.1; 417/423.5; 318/434; 318/60; 318/59

(58) Field of Classification Search
USPC ............ 417/44.1, 2, 42, 22, 423.5, 5; 416/44; 318/66, 277, 434, 55, 86, 68, 62; 361/695
See application file for complete search history.

(56) References Cited

U.S. PATENT DOCUMENTS

| 4,988,930 A | * | 1/1991 | Oberheide | 318/82 |
| 5,040,377 A | * | 8/1991 | Braun et al. | 62/183 |
| 5,422,550 A | * | 6/1995 | McClanahan et al. | 318/91 |
| 5,484,012 A | * | 1/1996 | Hiratsuka | 165/247 |

(Continued)

FOREIGN PATENT DOCUMENTS

| JP | 50-95802 | 7/1975 |
| JP | 58-218881 A | 12/1983 |

(Continued)

OTHER PUBLICATIONS

European Search Report of corresponding EP Application No. 08 75 2973.1 dated Jun. 16, 2014.

Primary Examiner — Charles Freay
Assistant Examiner — Alexander Comley
(74) Attorney, Agent, or Firm — Global IP Counselors

(57) ABSTRACT

A fan control system includes a first fan, a second fan that is adjacent to the first fan, a first motor that is configured to rotate the first fan, a second motor that is configured to rotate the second fan, and a control unit. The control unit is configured to control the rotational speeds of the first motor and the second motor, and to decrease the rotational speeds of both the first motor and the second motor when the rotational speed of the first motor must be decreased.

9 Claims, 8 Drawing Sheets

(56) References Cited

U.S. PATENT DOCUMENTS

| | | | | |
|---|---|---|---|---|
| 5,796,221 A | * | 8/1998 | Cramer et al. | 318/68 |
| 5,797,717 A | * | 8/1998 | Tanaka et al. | 417/14 |
| 6,327,425 B1 | * | 12/2001 | Strobel | 318/471 |
| 6,398,505 B1 | * | 6/2002 | Sekiguchi | 417/2 |
| 6,400,113 B1 | * | 6/2002 | Garcia et al. | 318/463 |
| 6,428,282 B1 | * | 8/2002 | Langley | 417/2 |
| 6,487,463 B1 | * | 11/2002 | Stepp, III | 700/79 |
| 6,573,671 B2 | * | 6/2003 | Montero et al. | 318/53 |
| 6,824,362 B2 | * | 11/2004 | Dodson, III | 417/22 |
| 6,933,687 B2 | * | 8/2005 | Makaran et al. | 318/34 |
| 6,954,684 B2 | * | 10/2005 | Frankel et al. | 700/300 |
| 7,088,062 B2 | * | 8/2006 | Makaran | 318/34 |
| 7,091,685 B2 | * | 8/2006 | Makaran | 318/400.01 |
| 7,132,809 B1 | * | 11/2006 | Chang | 318/400.13 |
| 7,205,737 B1 | * | 4/2007 | Bilodeau | 318/434 |
| 7,248,004 B2 | * | 7/2007 | Strupp | 318/49 |
| 2004/0022638 A1 | * | 2/2004 | Strupp | 417/2 |
| 2005/0115256 A1 | * | 6/2005 | Okano | 62/183 |
| 2005/0163615 A1 | | 7/2005 | Chheda et al. | |
| 2005/0207074 A1 | * | 9/2005 | Bielesch | 361/25 |
| 2006/0202647 A1 | * | 9/2006 | Lin | 318/66 |

FOREIGN PATENT DOCUMENTS

| | | |
|---|---|---|
| JP | 60-104797 A | 6/1985 |
| JP | 64-81695 A | 3/1989 |
| JP | 06-307382 A | 11/1994 |
| JP | 06-317292 A | 11/1994 |
| JP | 07-287625 A | 10/1995 |
| JP | 08-094156 A | 4/1996 |
| JP | 08-303386 A | 11/1996 |
| JP | 11-050993 A | 2/1999 |
| JP | 11-051454 A | 2/1999 |
| JP | 2000-166294 A | 6/2000 |
| JP | 2004-278438 A | 10/2004 |
| JP | 2004-293482 A | 10/2004 |
| JP | 2005-223320 A | 8/2005 |

* cited by examiner

FAN CONTROL SYSTEM AND AIR CONDITIONER THAT INCLUDES THE SAME

CROSS-REFERENCE TO RELATED APPLICATIONS

This U.S. National stage application claims priority under 35 U.S.C. §119(a) to Japanese Patent Application No. 2007-135038, filed in Japan on May 22, 2007, the entire contents of which are hereby incorporated herein by reference.

TECHNICAL FIELD

The present invention relates to a fan control system and more particularly relates to a fan control system that controls a plurality of fans and an air conditioner that comprises the same.

BACKGROUND ART

In recent years, the motors that drive the fans of outdoor units of air conditioners (hereinbelow, abbreviated as outdoor fans) have been controlled by inverters, wherein rotational speed is controlled in accordance with instructions regardless of the external load's size. Because outdoor fans are generally disposed outdoors, they are easily subject to loads in forward or reverse rotational direction caused by natural wind. As a result, motor current increases owing to loads in the reverse rotational direction, and the fan rotates at a speed that exceeds its target rotational speed owing to loads in the forward rotational direction; therefore, problems such as overcurrents, overvoltages, and loss of synchronization can sometimes arise and cause the fan to stop abnormally. One way of solving this problem is a method that has already been disclosed (e.g., refer to Japanese Patent Application Publication No. H8-303386), wherein a permissible rotational speed range, which is a speed range that is acceptable even when a motor is energized, is preset, and when the fan rotates at a speed outside of that permissible rotational speed, the motor is not energized.

SUMMARY OF THE INVENTION

Technical Problem

Nevertheless, while the method according to the Japanese Patent Application Publication No. H8-303386 principally avoids overloads when a single fan is driven, it does not disclose any method for dealing with the case wherein, as shown in FIG. 1, a plurality of outdoor fans are mounted in the same air passageway and, when all of the fans are operating, for example, just one of the fans becomes overloaded.

An object of the present invention is to provide a fan control system that controls a plurality of fans and, when a fan becomes overloaded during operation, eliminates that overload.

Solution to Problem

A fan control system according to a first aspect of the present invention comprises: a first fan; a second fan, which is adjacent to the first fan; a first motor, which rotates the first fan; a second motor, which rotates the second fan; and a control unit. The control unit controls the rotational speeds of the first motor and the second motor and, when the state has arisen wherein the operation of the first motor must be stopped, stops both the operation of the first motor and the operation of the second motor.

In this fan control system, the control unit stops the operation of the second motor when it stops the operation of the first motor; therefore, the situation wherein the first fan rotates in reverse or is subject to any load in the reverse rotational direction owing to dynamic pressure on the suction side of the second fan does not arise, which makes the first fan easy to restart.

A fan control system according to a second aspect of the present invention is a fan control system according to the first aspect of the present invention, wherein after the operation of the first motor and the second motor has been stopped, the control unit starts startup operations of the first motor and the second motor simultaneously.

In this fan control system, the first fan and the second fan start to rotate substantially simultaneously, which prevents situations wherein, for example, one fan rotates in reverse or one of the fans is subject to a load in the reverse rotational direction owing to dynamic pressure on the suction side of the other fan.

A fan control system according to a third aspect of the present invention is a fan control system according to the second aspect of the present invention, wherein the startup operations are started after the rotations of the first motor and the second motor have stopped.

In this fan control system, both the first motor and the second motor can be restarted from the stopped state, and therefore a load is not unnecessarily applied to either motor.

A fan control system according to a fourth aspect of the present invention is a fan control system according to the second aspect of the present invention, wherein the startup operations are started after the rotational speeds of the first motor and the second motor have fallen below a prescribed rotational speed.

In this fan control system, if the first motor and the second motor are rotating owing to inertial force after being stopped, or if the first motor and the second motor are rotating because the first fan and the second fan are subject to natural wind and cannot stop, then the system can stand by until the rotational speed of each of the motors reaches a rotational speed at which it can be started up, which decreases the load that is applied to each motor.

A fan control system according to a fifth aspect of the present invention is a fan control system according to the fourth aspect of the present invention, wherein the prescribed rotational speed is set to a rotational speed at which the first motor and the second motor do not stop abnormally when they are started up.

In this fan control system, the electrical currents that flow to the first motor and the second motor at startup or the DC voltages that increase owing to induced voltages generated by the first motor and the second motor at startup fall within permissible ranges, which decreases damage to each of the motors and its inverter circuit and rectification circuit.

A fan control system according to a sixth aspect of the present invention is a fan control system according to the second aspect of the present invention, wherein the startup operations are started after standing by for prescribed times since the operation of the first motor and of the second motor has been stopped.

In this fan control system, if each of the motors is rotating owing to inertial force even after the operation of the first motor and the second motor has been stopped, then the rotational speed of each of the motors can be decreased to a range at which it can be restarted by standing by for a prescribed time after the operation of each motor has stopped.

A fan control system according to a seventh aspect of the present invention is a fan control system according to the sixth aspect of the present invention, wherein the prescribed times are set to times at which the first motor and the second motor do not stop abnormally when they are started up.

In this fan control system, the electrical currents that flow to the first motor and the second motor at startup or the DC voltages that increase owing to induced voltages generated by the first motor and the second motor at startup fall within permissible ranges, which decreases damage to each of the motors and its inverter circuit and rectification circuit.

A fan control system according to an eighth aspect of the present invention comprises: a first fan; a second fan, which is adjacent to the first fan; a first motor, which rotates the first fan; a second motor, which rotates the second fan; and a control unit. The control unit controls the rotational speeds of the first motor and the second motor and, when the state has arisen wherein the rotational speed of the first motor must be decreased, decreases both the rotational speed of the first motor and the rotational speed of the second motor.

In this fan control system, if the rotational speed of the first motor decreases, then the first motor cannot oppose the load that works to rotate the first fan in reverse owing to dynamic pressure on the suction side of the second fan; therefore, the rotational speed of the second motor is decreased, which lightens the load that works to rotate the first fan in reverse.

A fan control system according to a ninth aspect of the present invention is a fan control system according to the eighth aspect of the present invention, wherein the range of decreases of the rotational speeds of the first motor and the second motor are determined based on the load state of the first fan.

In this fan control system, the range of decrease of the rotational speed is determined in accordance with the load state, and therefore the overload is eliminated early and an excessive decrease in airflow caused by decreasing the rotational speed more than necessary is prevented.

A fan control system according to a tenth aspect of the present invention is a fan control system according to the eighth or ninth aspects of the present invention, wherein the range of decrease of the rotational speed of the first motor and the range of decrease of the rotational speed of the second motor are different values.

In this fan control system, by making the ranges of decrease of the rotational speeds of the first motor and the second motor different, it is possible to reduce the range of decrease of the rotational speed of the motor that is not overloaded, and therefore excessive decrease in airflow is prevented.

A fan control system according to an eleventh aspect of the present invention comprises: a first fan; a second fan, which is adjacent to the first fan; a first motor, which rotates the first fan; a second motor, which rotates the second fan; and a control unit. The control unit controls the rotational speeds of the first motor and the second motor and, when the state has arisen wherein the rotational speed of the first motor must be decreased, decreases the rotational speed of the first motor and increases the rotational speed of the second motor.

In this fan control system, while the overload of the first motor is eliminated by a decrease in rotational speed of the first motor, the insufficient airflow of the first fan caused by the decrease in rotational speed of the first motor is supplemented by an increase in the rotational speed of the second motor.

A fan control system according to a twelfth aspect of the present invention is a fan control system according to the eleventh aspect of the present invention, wherein the range of decrease of the rotational speed of the first motor is determined based on the load state of the first fan.

In this fan control system, the range of decrease of the rotational speed is determined in accordance with the load state, and therefore the overload is eliminated early and an excessive decrease in airflow caused by decreasing the rotational speed more than necessary is prevented.

A fan control system according to a thirteenth aspect of the present invention is a fan control system according to the eleventh or twelfth aspects of the present invention, wherein the range of increase of the rotational speed of the second motor is determined based on the range of decrease of the rotational speed of the first motor and the sum of the airflows demanded of the first fan and the second fan.

In this fan control system, an excessive decrease in airflow is prevented.

A fan control system according to a fourteenth aspect of the present invention comprises: a first fan; a second fan, which is adjacent to the first fan; a first motor, which rotates the first fan; a second motor, which rotates the second fan; and a control unit. The control unit controls the rotational speeds of the first motor and the second motor and, when the state has arisen wherein the rotational speed of the first motor must be decreased, decreases the rotational speed of the first motor; when the rotational speed of the first motor, whose rotational speed has been decreased, is lower than a prescribed rotational speed, decreases the rotational speed of the second motor; and when the rotational speed of the first motor, whose rotational speed has been decreased, is higher than the prescribed rotational speed, increases the rotational speed of the second motor.

In this fan control system, if the rotational speed of the first motor falls below the prescribed rotational speed, then the first motor cannot oppose the dynamic pressure on the suction side of the second fan; therefore, the rotational speed of the second motor is decreased, which lowers the dynamic pressure on the suction side of the second fan. Moreover, when the rotational speed of the first motor is higher than the prescribed rotational speed, there is margin enough to oppose the dynamic pressure on the suction side of the second fan and therefore to rotate; therefore, the rotational speed of the second motor is increased, which makes it possible to supplement the decrease in airflow of the first fan owing to the decrease in rotational speed of the first motor.

A fan control system according to a fifteenth aspect of the present invention is a fan control system according to the fourteenth aspect of the present invention, wherein the range of decreases of the rotational speeds of the first motor and the second motor are determined based on the load state of the first fan.

In this fan control system, the range of decrease of the rotational speed is determined in accordance with the load state, and therefore the overload is eliminated early and an excessive decrease in airflow caused by decreasing the rotational speed more than necessary is prevented.

A fan control system according to a sixteenth aspect of the present invention is a fan control system according to the fourteenth or fifteenth aspects of the present invention, wherein the range of decrease of the rotational speed of the first motor and the range of decrease of the rotational speed of the second motor are different values.

In this fan control system, by making the ranges of decrease of the rotational speeds of the first motor and the second motor different, it is possible to reduce the range of decrease of the rotational speed of the motor that is not overloaded, and therefore excessive decrease in airflow is prevented.

A fan control system according to a seventeenth aspect of the present invention is a fan control system according to any one of the fourteenth through sixteenth aspects of the present invention, wherein the range of increase of the rotational speed of the second motor is determined based on the range of decrease of the rotational speed of the first motor and the sum of the airflows demanded of the first fan and the second fan.

In this fan control system, an excessive decrease in airflow can be prevented.

A fan control system according to a eighteenth aspect of the present invention is a fan control system according to any one of the first through seventeenth aspects of the present invention, wherein the first fan and the second fan are installed in the same air passageway.

In this fan control system, control is performed such that an unnecessary load does not act on the adjacent fan; therefore, it is unnecessary to partition the first fan and the second fan from one another even if they are installed in the same air passageway, which simplifies the structure.

An air conditioner according to a nineteenth aspect of the present invention comprises: a fan control system according to any one of the first through eighteenth aspects of the present invention.

In this air conditioner, the stoppage of the fans is suppressed, which prevents an excessive drop in the performance of the air conditioner.

Advantageous Effects of the Invention

In the fan control system according to the first aspect of the present invention, the control unit stops the operation of the second motor when it stops the operation of the first motor; therefore, the situation wherein the first fan rotates in reverse or is subject to any load in the reverse rotational direction owing to dynamic pressure on the suction side of the second fan does not arise, which makes the first fan easy to restart.

In the fan control system according to the second aspect of the present invention, the first fan and the second fan start to rotate substantially simultaneously, which prevents situations wherein for example, one fan rotates in reverse or one of the fans is subject to a load in the reverse rotational direction owing to dynamic pressure on the suction side of the other fan.

In the fan control system according to the third aspect of the present invention, both the first motor and the second motor can be restarted from the stopped state, and therefore a load is not unnecessarily applied to either motor.

In the fan control system according to the fourth aspect of the present invention, if the first motor and the second motor are rotating owing to inertial force after being stopped, or if the first motor and the second motor are rotating because the first fan and the second fan are subject to natural wind and cannot stop, then the system can stand by until the rotational speed of each of the motors reaches a rotational speed at which it can be started up, which decreases the load that is applied to each motor.

In the fan control system according to the fifth aspect of the present invention, the electrical currents that flow to the first motor and the second motor at startup or the DC voltages that increase owing to induced voltages generated by the first motor and the second motor at startup fall within permissible ranges, which decreases damage to each of the motors and its inverter circuit and rectification circuit.

In the fan control system according to the sixth aspect of the present invention, if each of the motors is rotating owing to inertial force even after the operation of the first motor and the second motor has been stopped, then the rotational speed of each of the motors can be decreased to a range at which it can be restarted by standing by for a prescribed time after the operation of the motor has stopped.

In the fan control system according to the seventh aspect of the present invention, the electrical currents that flow to the first motor and the second motor at startup or the DC voltages that increase owing to induced voltages generated by the first motor and the second motor at startup fall within permissible ranges, which decreases damage to each of the motors and its inverter circuit and rectification circuit.

In the fan control system according to the eighth aspect of the present invention, if the rotational speed of the first motor decreases, then the first motor cannot oppose the load that works to rotate the first fan in reverse owing to dynamic pressure on the suction side of the second fan; therefore, the rotational speed of the second motor is decreased, which lightens the load that works to rotate the first fan in reverse.

In the fan control system according to the ninth aspect of the present invention, the range of decrease of the rotational speed is determined in accordance with the load state, and therefore the overload is eliminated easily and an excessive decrease in airflow caused by decreasing the rotational speed more than necessary is prevented.

In the fan control system according to the tenth aspect of the present invention, by making the ranges of decrease of the rotational speeds of the first motor and the second motor different, it is possible to reduce the range of decrease of the rotational speed of the motor that is not overloaded, and therefore excessive decrease in airflow is prevented.

In the fan control system according to the eleventh aspect of the present invention, while the overload of the first motor is eliminated by a decrease in rotational speed of the first motor, the insufficient airflow of the first fan caused by the decrease in rotational speed of the first motor is supplemented by an increase in the rotational speed of the second motor.

In the fan control system according to the twelfth aspect of the present invention, the range of decrease of the rotational speed is determined in accordance with the load state, and therefore the overload is eliminated early and an excessive decrease in airflow caused by decreasing the rotational speed more than necessary is prevented.

In the fan control system according to the thirteenth aspect of the present invention, an excessive decrease in airflow is prevented.

In the fan control system according to the fourteenth aspect of the present invention, when the rotational speed of the first motor is higher than the prescribed rotational speed, there is margin enough to oppose the dynamic pressure on the suction side of the second fan and therefore to rotate; therefore, the rotational speed of the second motor is increased, which makes it possible to supplement the decrease in airflow of the first fan owing to the decrease in rotational speed of the first motor.

In the fan control system according to the fifteenth aspect of the present invention, the range of decrease of the rotational speed is determined in accordance with the load state, and therefore the overload is eliminated early and an excessive decrease in airflow caused by decreasing the rotational speed more than necessary is prevented.

In the fan control system according to the sixteenth aspect of the present invention, by making the ranges of decrease of the rotational speeds of the first motor and the second motor different, it is possible to reduce the range of decrease of the rotational speed of the motor that is not overloaded, and therefore excessive decrease in airflow can be prevented.

In the fan control system according to the seventeenth aspect of the present invention, an excessive decrease in airflow can be prevented.

In the fan control system according to the eighteenth aspect of the present invention, control is performed such that an unnecessary load does not act on the adjacent fan; therefore, it is unnecessary to partition the first fan and the second fan from one another even if they are installed in the same air passageway, which simplifies the structure.

In the fan control system according to the nineteenth aspect of the present invention, the stoppage of the fans is suppressed, which prevents an excessive drop in the performance of the air conditioner.

DETAILED DESCRIPTION OF THE PREFERRED EMBODIMENTS

The embodiments of the present invention will now be explained, referencing the drawings. Furthermore, the embodiments below are merely illustrative examples of the present invention and do not limit its technical scope.

First Embodiment

Fan Control System

Figure 1:
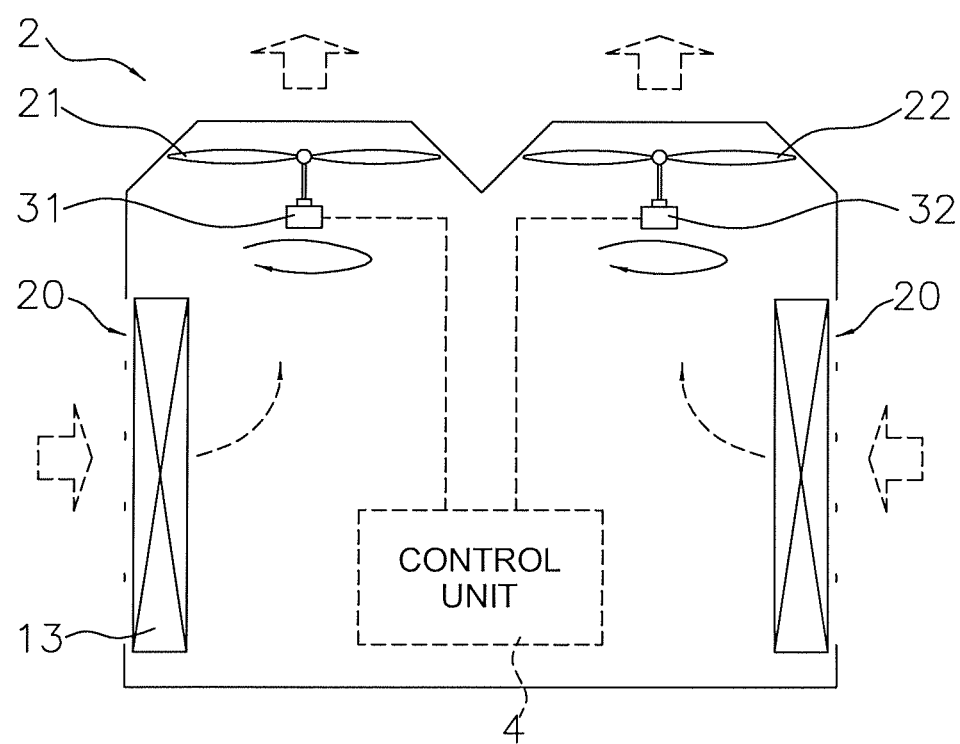
FIG. 1 is a configuration diagram of an air conditioner's outdoor unit that uses a fan control system according to an embodiment of the present invention.

FIG. 1 is a configuration diagram of an air conditioner's outdoor unit that uses a fan control system according to an embodiment of the present invention. In FIG. 1, a first fan 21 and a second fan 22, which are adjacent to one another, are disposed in an upper part of an air conditioner's outdoor unit 2. The first fan 21 is directly coupled to a rotary shaft of a first motor 31, and the second fan 22 is directly coupled to a rotary shaft of a second motor 32. The rotational speeds of the first motor 31 and the second motor 32 are controlled by inverters, and their rotational speeds and acceleration can be easily changed.

A control unit 4 is housed in a prescribed electrical equipment box of the air conditioner's outdoor unit 2 and controls the rotational speeds of the first motor 31 and the second motor 32. An outdoor heat exchanger 13 is disposed along sidewalls of the air conditioner's outdoor unit 2. Suction ports 20 are formed in the sidewalls of the air conditioner's outdoor unit 2; furthermore, by the rotation of the first fan 21 and the second fan 22, the air is sucked in via the suction ports 20, passes through the outdoor heat exchanger 13, reaches the first fan 21 and the second fan 22, and is blown out upward from the air conditioner's outdoor unit 2.

<Control Circuit>

Figure 2:
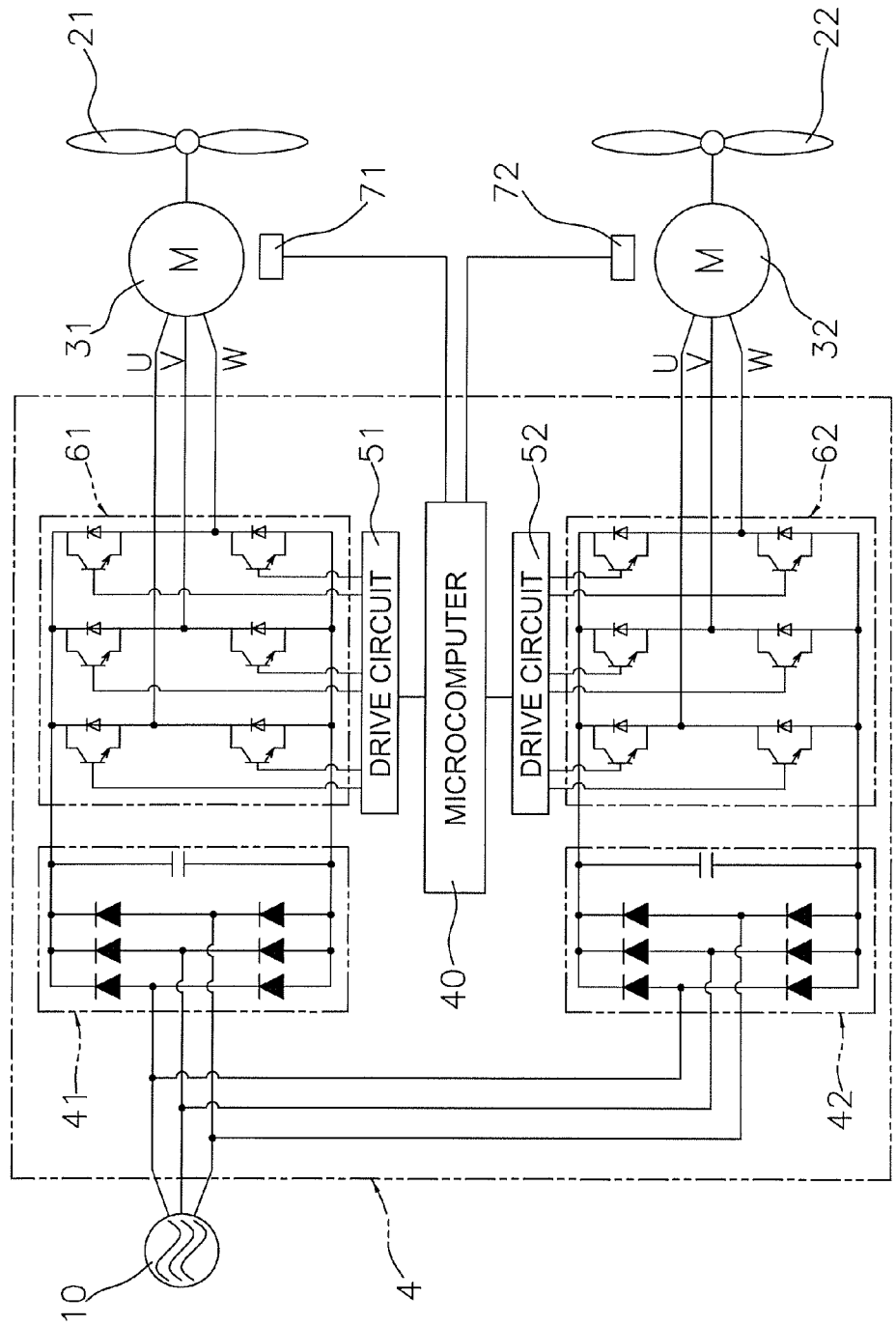
FIG. 2 is a circuit diagram of the same fan control system as FIG. 1.

FIG. 2 is a circuit diagram of the fan control system. In FIG. 2, the control unit 4 comprises two rectification circuits 41, 42, two drive circuits 51, 52, and two inverter circuits 61, 62, all of which are for controlling the rotational speeds of the first motor 31 and the second motor 32. The control unit 4 further comprises a microcomputer 40, which controls the two drive circuits 51, 52. A CPU and memory are built into the microcomputer 40. The first motor 31 and the second motor 32 are brushless DC motors; the first motor 31 comprises a stator, to which a voltage is supplied from the inverter circuit 61, and a rotor, which comprises a magnet that opposes that stator; furthermore, the second motor 32 comprises a stator, to which a voltage is supplied from the inverter circuit 62, and a rotor, which comprises a magnet that opposes that stator.

The rectification circuits 41, 42 are bridge circuits that each comprise six diodes and supply DC voltages they generate from the AC voltage supplied by a power supply 10 to the inverter circuits 61, 62. The inverter circuits 61, 62 are bridge circuits that each comprise six transistors and drive signals are input to the transistors from the drive circuits 51, 52.

A first rotational speed sensor 71 detects the rotational speed of the first motor 31. A Hall element is incorporated in the stator of the first motor 31, and the first rotational speed sensor 71 can detect the rotational speed of the rotor of the first motor 31 via that Hall element. Similarly, a second rotational speed sensor 72 detects the rotational speed of the second motor 32. A Hall element is incorporated in the stator of the second motor 32, and the second rotational speed sensor 72 can detect the rotational speed of the rotor of the second motor 32 via that Hall element.

In the present embodiment, the rotational speeds of the first motor 31 and the second motor 32 substitute for the rotational speeds of the first fan 21 and the second fan 22. While monitoring the detection signals output from the first rotational speed sensor 71 and the second rotational speed sensor 72, the microcomputer 40 inputs the drive signals to the transistors of the inverter circuits 61, 62 such that the first fan 21 and the second fan 22 reach a prescribed rotational speed.

<Fan Stop and Restart Control>

In an air conditioner's outdoor unit wherein a plurality of fans is used in the same air passageway, if, when all of the fans are rotating, one of the fans becomes overloaded and stops, then the stopped fan either rotates in reverse or receives a load in the reverse rotational direction owing to dynamic pressure on the suction side of the rotating fan, making it difficult to restart. To avoid this problem, fan stop and restart control is performed in such a fan control system. Fan stop and restart control will now be explained, referencing the drawings.

Figure 3:
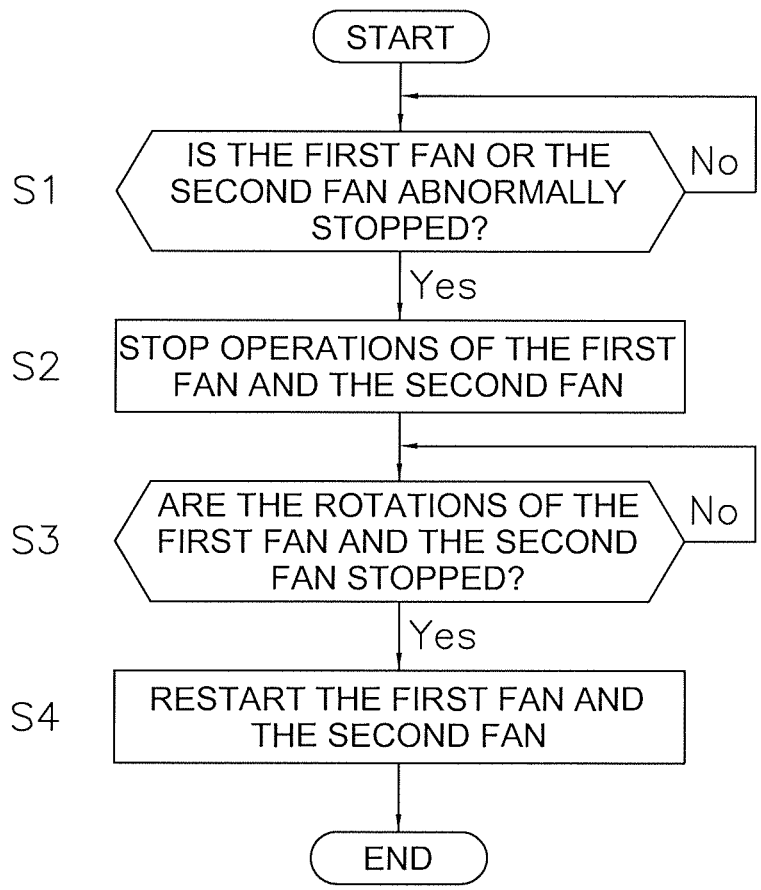
FIG. 3 is a flow chart of fan stop and restart control.

FIG. 3 is a flow chart of fan stop and restart control. In step S1 in FIG. 3, the microcomputer 40 determines whether the first fan 21 or the second fan 22 has stopped abnormally owing to an overload. If either of these fans has abnormally stopped, then the method proceeds to step S2, wherein the operation of the fan that is not abnormally stopped is stopped and both the first fan 21 and the second fan 22 transition to a state wherein their operation is stopped.

In step S3, the method determines whether the rotations of the first fan 21 and the second fan 22 are stopped. Even if the operation of the first fan 21 and the second fan 22 is stopped, the fans sometimes either rotate owing to inertial force or rotate in the forward or reverse rotational directions owing to natural wind. If every motor is restarted in such a state, either the motor currents sometimes increase owing to the loads in the reverse rotational direction or the fans sometimes rotate at speeds that exceed their target rotational speeds owing to loads in the forward rotational direction, which causes problems such as overcurrents, overvoltages, and loss of synchronization, and the fans may stop abnormally. If the determination in step S3 changes to YES, then the method proceeds to step S4, wherein restart operations of the first fan 21 and the second fan 22 are started.

In fan stop and restart control as described above, if even one of the fans of the plurality of fans used in the same air passageway stops abnormally, then the microcomputer 40 temporarily stops all of the fans and performs the restart operations.

<Fan Overload Avoidance Control>

The abovementioned fan stop and restart control is for the case wherein a fan stops abnormally owing to an overload; however, in actual operation, stopping a fan reduces the amount of heat exchanged by the outdoor heat exchanger 13 and decreases the operation performance of the air conditioner's outdoor unit 2; therefore, it is preferable to avoid stopping a fan as much as possible. In this fan control system, when a fan becomes overloaded, fan overload avoidance control is performed, which eliminates the overload without immediately stopping the fan. Fan overload avoidance control will now be explained referencing the drawings.

Figure 4:
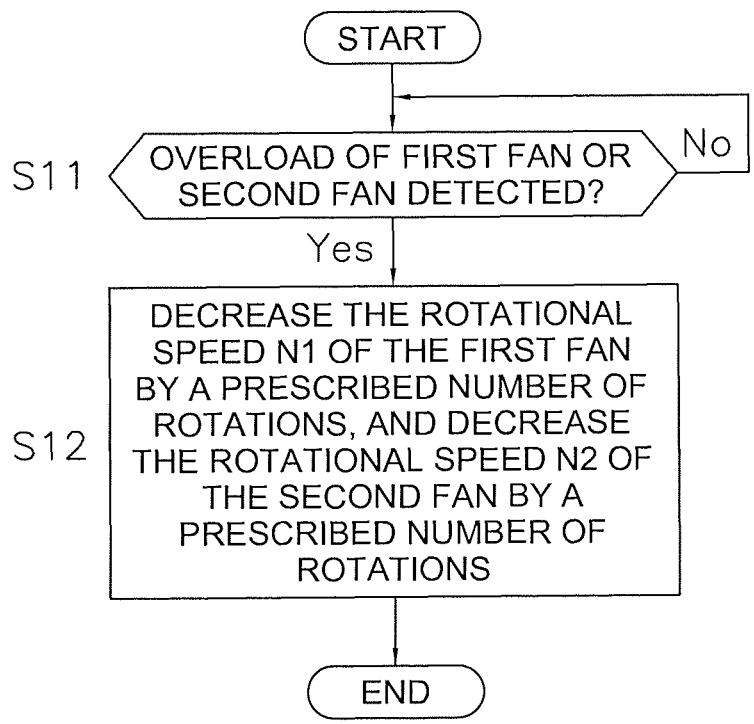
FIG. 4 is a flow chart of fan overload avoidance control.

FIG. 4 is a flow chart of fan overload avoidance control. In step S11 in FIG. 4, the microcomputer 40 determines whether the first fan 21 or the second fan 22 has become overloaded. If an overload is detected, then the method proceeds to step S12; if an overload is not detected, then the method continues to monitor for an overload.

In step S12, both the rotational speed N1 of the first fan 21 and the rotational speed N2 of the second fan 22 are decreased by prescribed numbers of rotations per minute. The control unit 4 both eliminates the overload by decreasing the rotational speed of the fan that has become overloaded and decreases the rotational speed of the adjacent fan, thereby suppressing the load that results from the dynamic pressure on the suction side of the adjacent fan.

The method determines the range within which the rotational speeds of the first motor 31 and the second motor 32 may be decreased based on the load state of the fan that has become overloaded; thereby, the overload is eliminated easily. In the present embodiment, to prevent an excessive decrease in airflow, the range of decrease of the rotational speed of the fan that is not overloaded is restricted as much as possible; as a result, the range of decrease of the rotational speed of the first motor 31 and the range of decrease of the rotational speed of the second motor 32 have different values.

In fan overload avoidance control of the present embodiment as described above, if even one fan of the plurality of fans used in the same air passageway becomes overloaded, then the microcomputer 40 decreases the rotational speeds of all of the fans.

First Modified Example of the First Embodiment

In fan stop and restart control according to the first embodiment, stopping the rotation of the first motor 31 and the second motor 32 is one condition for restarting the first motor 31 and the second motor 32. However, if the first fan 21 and the second fan 22 are subject to natural wind, then their rotations are maintained and the method stands by until those rotations stop, which is inefficient. Accordingly, in the first modified example, control that permits restarting when rotational speed falls below a prescribed rotational speed is performed. This will now be explained, referencing the drawings.

<Fan Stop and Restart Control>

Figure 5:
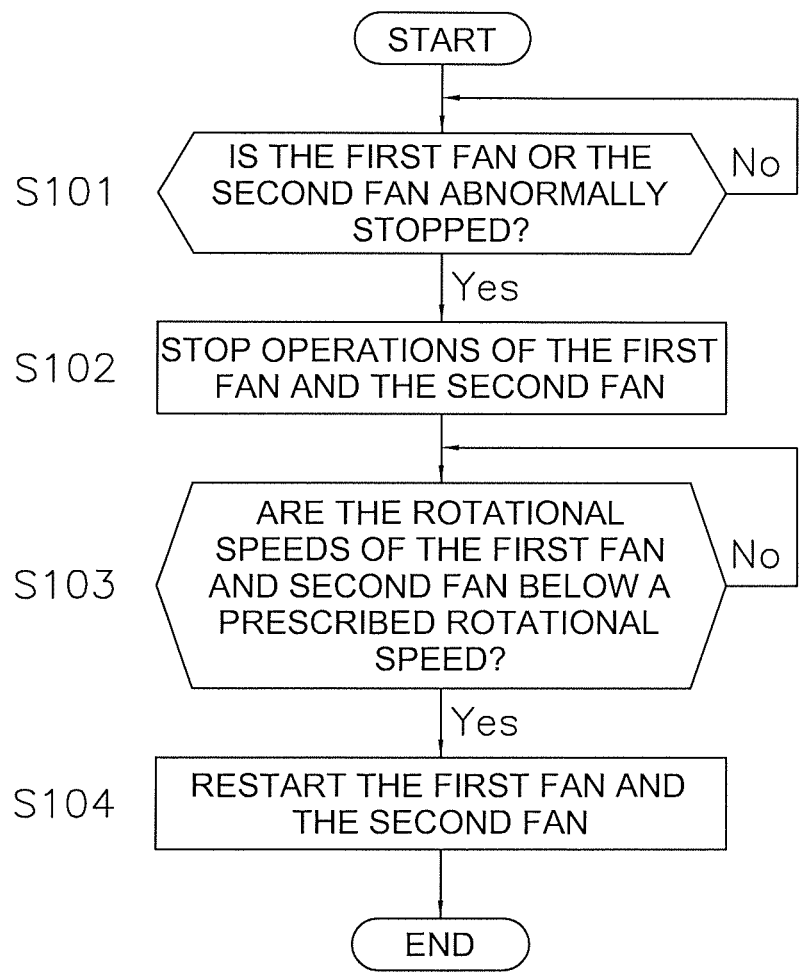
FIG. 5 is a flow chart of fan stop and restart control according to a first modified example.

FIG. 5 is a flow chart of fan stop and restart control according to a first modified example. In step S101 in FIG. 5, the microcomputer 40 determines whether the first fan 21 or the second fan 22 has stopped abnormally owing to an overload. If either of these fans has abnormally stopped, then the method proceeds to step S102, wherein the operation of the fan that is not abnormally stopped is stopped and both the first fan 21 and the second fan 22 transition to a state wherein their operation is stopped.

In step S103, the method determines whether the rotational speeds of the first fan 21 and the second fan 22 have fallen below the prescribed rotational speed. Even if the operation of the first fan 21 and the second fan 22 is stopped, the motors sometimes either rotate owing to inertial force or rotate in the forward or reverse rotational directions owing to natural wind. If every motor is restarted in such a state, either the motor currents sometimes increase owing to the loads in the reverse rotational direction or the fans sometimes rotate at speeds that exceed their target rotational speeds owing to loads in the forward rotational direction, which causes problems such as overcurrents, overvoltages, and loss of synchronization, and the motors may stop abnormally.

However, if that rotational speed is less than the prescribed rotational speed at which it was empirically verified that the fan will not stop abnormally even if a restart operation is started, then the fan can be started up safely. If the determination in step S103 changes to YES, then the method proceeds to step S104, wherein the restart operations of the first fan 21 and the second fan 22 are started.

Second Modified Example of the First Embodiment

In fan stop and restart control according to the first modified example, one condition for restarting the first motor 31 and the second motor 32 is the rotational speeds thereof falling below the prescribed rotational speed; furthermore, as a means of obtaining a similar effect, in the second modified example, control is performed wherein restarting is permitted after standing by for a prescribed time after the operation of the first motor 31 and the second motor 32 is stopped. This will now be explained, referencing the drawings.

<Fan Stop and Restart Control>

Figure 6:
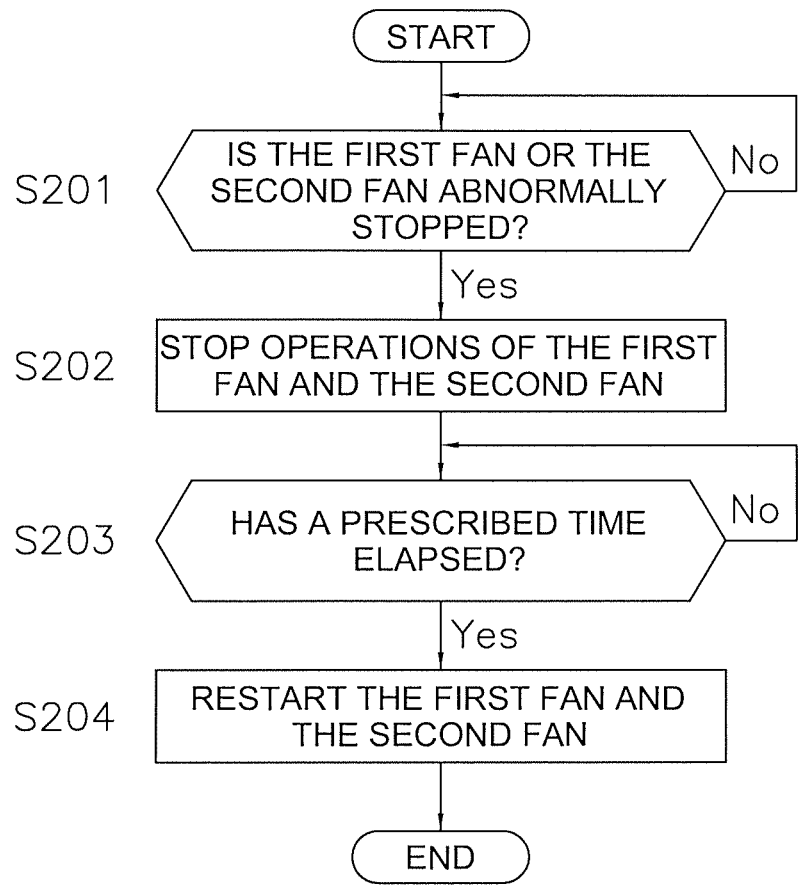
FIG. 6 is a flow chart of fan stop and restart control according to a second modified example.

FIG. 6 is a flow chart of fan stop and restart control according to a second modified example. In step S201 in FIG. 6, the microcomputer 40 determines whether the first fan 21 or the second fan 22 has stopped abnormally owing to an overload. If either of these fans has abnormally stopped, then the method proceeds to step S202, wherein the operation of the fan that is not abnormally stopped is stopped and both the first fan 21 and the second fan 22 transition to a state wherein their operation is stopped.

In step S203, the method determines whether a prescribed time has elapsed since the operations of the first fan 21 and the second fan 22 were stopped. Even after the operation of the first fan 21 and the second fan 22 is stopped, the motors sometimes either rotate owing to inertial force or rotate in the forward or reverse rotational directions owing to natural wind. If every motor is restarted in the state wherein their rotational speeds have not fallen into a safe range, either the motor currents sometimes increase owing to the loads in the reverse rotational direction or the fans sometimes rotate at speeds that exceed their target rotational speeds owing to loads in the forward rotational direction, which causes problems such as overcurrents, overvoltages, and loss of synchronization, and the fans may stop abnormally.

However, if the prescribed time at which it was empirically verified that the fan will not stop abnormally even if a restart operation is started has elapsed, then the fan can be started up safely because its rotational speed has fallen into the safe range. If the determination in step S203 changes to YES, then the method proceeds to step S204, wherein the restart operations of the first fan 21 and the second fan 22 are started.

<Features of the First Embodiment>

(1)

In this fan control system, when the control unit 4 stops the first motor 31, it also stops the second motor 32; therefore, the situation where the first fan 21 rotates in reverse owing to dynamic pressure on the suction side of the second fan 22 or is it subject to any load in the reverse rotational direction does not arise, which makes it easy for the first fan 21 to restart. Likewise, when the control unit 4 stops the second motor 32, it also stops the first motor 31; therefore, the situation where the second fan 22 rotates in reverse owing to dynamic pressure on the suction side of the first fan 21 or is it subject to any load in the reverse rotational direction does not arise, which makes it easy for the second fan 22 to restart. In addition, startup operations of the first motor 31 and the second motor 32 are started simultaneously; therefore, the first fan 21 and the second fan 22 start to rotate substantially simultaneously, and it is possible to prevent situations wherein, for example, the dynamic pressure on the suction side of one of the fans causes the other fan to rotate in reverse or a fan is subject to a load in the reverse rotational direction.

(2)

In this fan control system, if the system transitions to the state wherein the rotational speed of the first motor 31 must be decreased because of an overload, then the control unit 4 decreases the rotational speeds of both the first motor 31 and the second motor 32 and thereby lightens the load that works to rotate the first fan 21 in reverse. Likewise, if the system transitions to the state wherein the rotational speed of the second motor 32 must be decreased because of an overload, then the control unit 4 decreases the rotational speeds of both the second motor 32 and the first motor 31 and thereby lightens the load that works to rotate the second fan 22 in reverse.

Second Embodiment

In fan overload avoidance control according to the first embodiment, control that avoids overloads, wherein, when one of the fans overloads, the rotational speed of the other fan is decreased unconditionally, is adopted; however, to ensure sufficient airflow, control that increases the rotational speed—within a feasible range—of the fan that is not overloaded may be performed.

<Fan Overload Avoidance Control>

Figure 7:
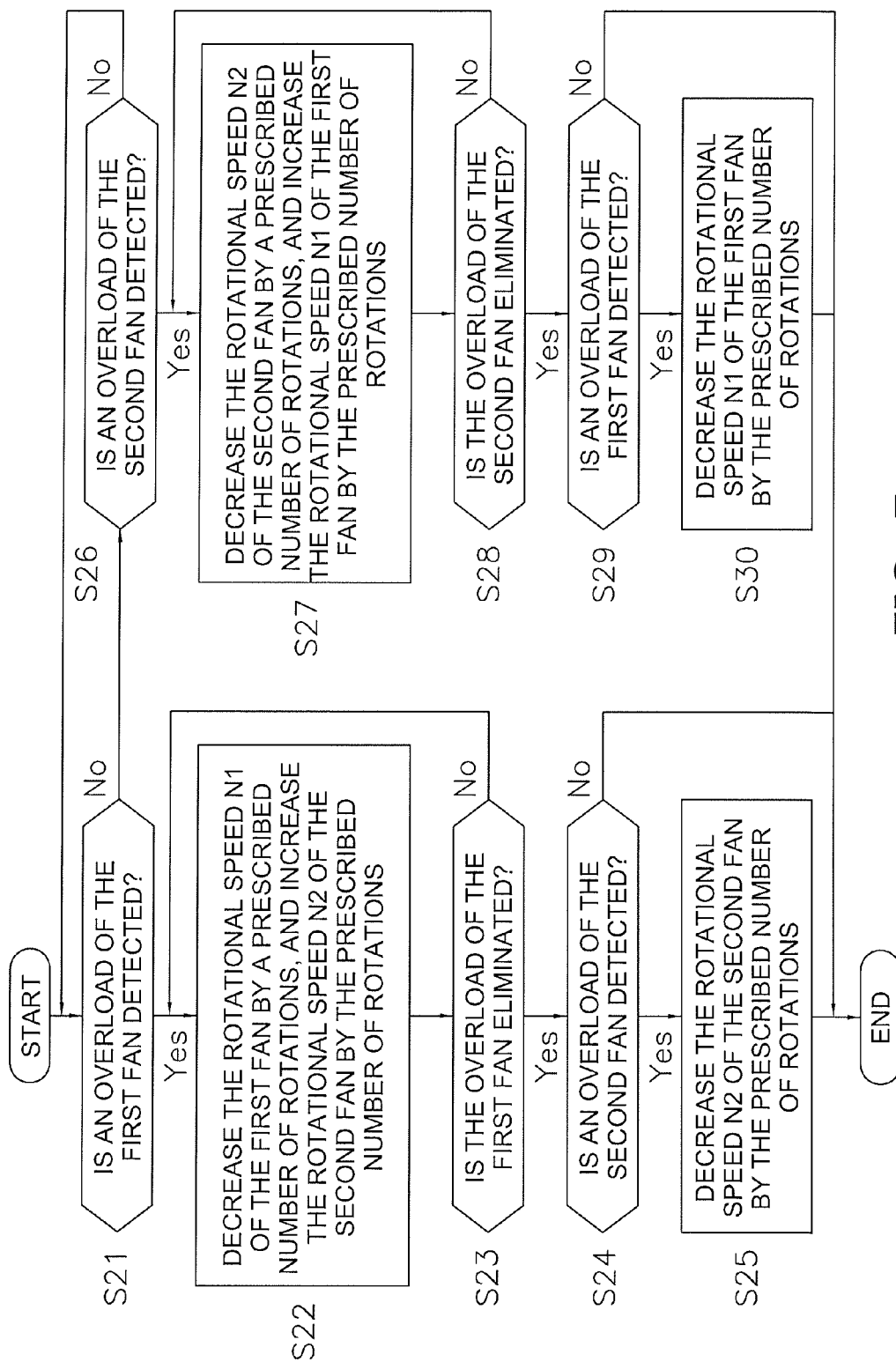
FIG. 7 is a flow chart of fan overload avoidance control according to a second embodiment.

FIG. 7 is a flow chart of fan overload avoidance control according to the second embodiment. In step S21 in FIG. 7, the microcomputer 40 determines whether the first fan 21 is overloaded. If an overload is detected, then the method proceeds to step S22; if an overload is not detected, then the method proceeds to step S26.

In step S22, the rotational speed N1 of the first fan 21 is decreased by a prescribed number of rotations, and the rotational speed N2 of the second fan 22 is increased by a prescribed number of rotations. Here, decreasing the rotational speed of the first fan 21 eliminates the overload thereof and increases the rotational speed of the second fan 22, which in turn supplements any decrease in airflow owing to the decrease in rotational speed of the first fan 21.

The method determines the range of decrease of the rotational speed of the first motor 31 based on the load state of the first fan 21; furthermore, determining the range of decrease of the rotational speed in accordance with the load state eliminates the overload early. In addition, to prevent an excessive decrease in airflow, the method determines the range of increase in the rotational speed of the second motor 32 based on both the range of decrease in the rotational speed of the first motor 31 and the sum of the airflows demanded of the first fan 21 and the second fan 22.

However, even if the rotational speed of the first fan 21 is decreased in step S22, it is possible that the dynamic pressure on the suction side will increase owing to an increase in the rotational speed of the second fan 22 and that a load will work to rotate the first fan 21 in the reverse direction, thereby failing to eliminate the overload of the first fan 21. Consequently, in step S23, the method determines whether the overload of the first fan 21 has been eliminated. If the overload has been eliminated, then the method proceeds to step S24; if the overload has not been eliminated, then the method returns to step S22.

In addition, even if the overload of the first fan 21 has been eliminated in step S22, it is also possible that the second fan 22 will overload owing to an increase in its rotational speed. Consequently, in step S24, the method determines whether the second fan 22 is overloaded. If an overload of the second fan 22 is detected, then the method proceeds to step S25, wherein the overload of the second fan 22 is eliminated by decreasing the rotational speed N2 of the second fan 22 by a prescribed number of rotations. If an overload is not detected, then control terminates.

Furthermore, if an overload of the first fan 21 was not detected in step S21, then the method proceeds to step S26, wherein the method determines whether the second fan 22 is overloaded. Here, if an overload is detected, then the method proceeds to step S27; furthermore, if an overload is not detected, then the method returns to step S21.

In step S27, the rotational speed N2 of the second fan 22 is decreased by a prescribed number of rotations, and the rotational speed N1 of the first fan 21 is increased by a prescribed number of rotations. Here, decreasing the rotational speed of the second fan 22 eliminates the overload thereof and increases the rotational speed of the first fan 21, which in turn supplements any decrease in airflow owing to the decrease in rotational speed of the second fan 22.

The method determines the range of decrease of the rotational speed of the second motor 32 based on the load state of the second fan 22; furthermore, determining the range of decrease of the rotational speed in accordance with the load state eliminates the overload early. In addition, to prevent an excessive decrease in airflow, the method determines the range of increase in the rotational speed of the first motor 31 based on both the range of decrease in the rotational speed of the second motor 32 and the sum of the airflows demanded of the first fan 21 and the second fan 22.

However, even if the rotational speed of the second fan 22 is decreased in step S27, it is possible that the dynamic pressure on the suction side will increase owing to an increase in the rotational speed of the first fan 21 and that a load will work to rotate the second fan 22 in the reverse direction, thereby failing to eliminate the overload of the second fan 22. Consequently, in step S28, the method determines whether the overload of the second fan 22 has been eliminated. If the overload has been eliminated, then the method proceeds to step S29; if the overload has not been eliminated, then the method returns to step S27.

In addition, even if the overload of the second fan 22 has been eliminated in step S27, it is also possible that the first fan 21 will overload owing to an increase in its rotational speed. Consequently, in step S29, the method determines whether the first fan 21 is overloaded. If an overload of the first fan 21 is detected, then the method proceeds to step S30, wherein the overload of the first fan 21 is eliminated by decreasing the rotational speed N1 of the first fan 21 by a prescribed number of rotations. If an overload is not detected, then control terminates.

In fan overload avoidance control according to the second embodiment as described above, the microcomputer 40 avoids an overload by decreasing the rotational speed of the fan that has become overloaded and, while doing so, increases, as much as possible, the rotational speed of the adjacent fan, thereby supplementing the reduced airflow.

<Features of the Second Embodiment>

In this fan control system, if the system transitions to the state wherein the rotational speed of the first motor 31 must be decreased because of an overload, then the control unit 4 decreases the rotational speed of the first motor 31 and increases the rotational speed of the second motor 32, thereby supplementing the insufficient airflow of the first fan 21 while eliminating the overload of the first motor 31. Likewise, if the system transitions to the state wherein the rotational speed of the second motor 32 must be decreased because of an overload, then the control unit 4 decreases the rotational speed of the second motor 32 and increases the rotational speed of the first motor 31, thereby supplementing the insufficient airflow of the second fan 22 while eliminating the overload of the second motor 32.

Third Embodiment

As in the second embodiment, in fan overload avoidance control according to a third embodiment, to ensure sufficient airflow, control that increases the rotational speed—within a feasible range—of the fan that is not overloaded is performed.

<Fan Overload Avoidance Control>

Figure 8:
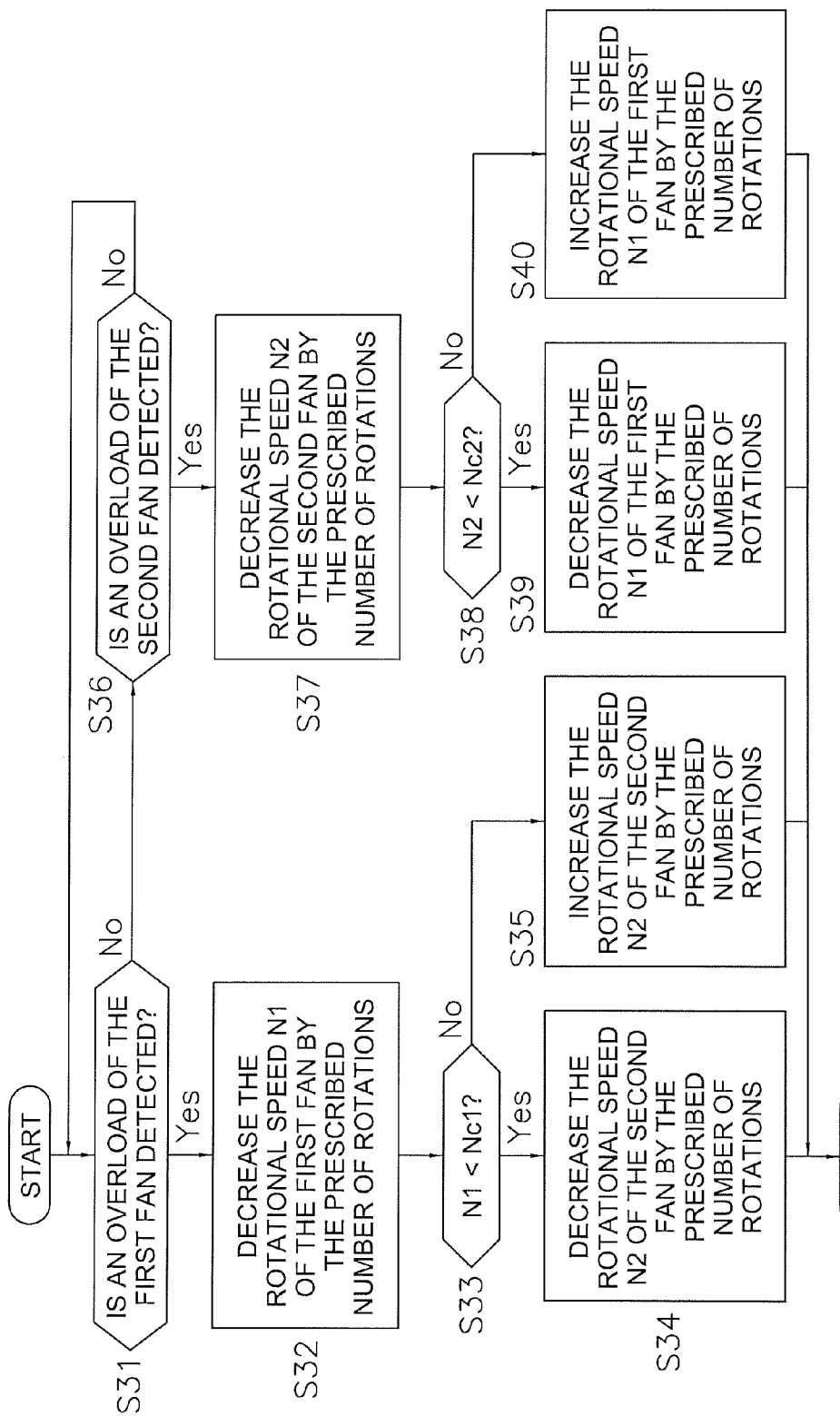
FIG. 8 is a flow chart of fan overload avoidance control according to a third embodiment.

FIG. 8 is a flow chart of fan overload avoidance control according to the third embodiment. In step S31 in FIG. 8, the microcomputer 40 determines whether the first fan 21 is overloaded. If an overload is detected, then the method proceeds to step S32; if an overload is not detected, then the method proceeds to step S36.

In step S32, the method decreases the rotational speed of the first fan 21 by the prescribed number of rotations and thereby eliminates the overload of the first fan 21. In step S33, the method determines whether the rotational speed N1 after the rotational speed of the first fan 21 has been decreased has fallen below a prescribed rotational speed Nc1. Here, the rotational speed that can oppose the dynamic pressure on the suction side of the adjacent second fan 22 is preset as the prescribed rotational speed Nc1; furthermore, if, after the reduction, the rotational speed falls below the prescribed rotational speed Nc1, then the overload of the first fan 21 will not be eliminated when the rotational speed of the second fan 22 is increased.

If the determination in step S33 is YES, then the method proceeds to step S34, wherein the rotational speed of the second fan 22 is decreased by the prescribed number of rotations. The method determines the range of decrease of the rotational speeds of the first motor 31 and the second motor 32 based on the load state of the first fan 21, and therefore the overload is eliminated early. Here, to prevent any excessive decrease in airflow, the range of decrease of the rotational speed of the second motor 32, which is not overloaded, is restricted as much as possible, and therefore the range of decrease of the rotational speed of the first motor 31 and the range of decrease of the rotational speed of the second motor 32 are different values.

If the determination in step S33 is NO, then the method proceeds to step S35, wherein the rotational speed of the second fan 22 is increased by the prescribed number of rotations, and thereby the reduced airflow is supplemented. The method determines the range of increase of the rotational speed of the second motor 32 based on the range of decrease of the rotational speed of the first motor 31 and the sum of the airflows demanded of the first fan 21 and the second fan 22, which prevents any excessive decrease in airflow.

Furthermore, if an overload was not detected in step S31, then the method proceeds to step S36, wherein the method determines whether the second fan 22 is overloaded. If YES, then the method proceeds to step S37; if NO, then the method returns to START.

In step S37, the rotational speed of the second fan 22 is decreased by the prescribed number of rotations, which eliminates its overload. In step S38, the method determines whether the rotational speed N2 after the rotational speed of the second fan 22 has been decreased has fallen below a prescribed rotational speed Nc2. Here, the rotational speed that can oppose the dynamic pressure on the suction side of the adjacent first fan 21 is preset as the prescribed rotational speed Nc2; furthermore, if, after the reduction, the rotational speed falls below the prescribed rotational speed Nc2, then the overload of the second fan 22 will not be eliminated when the rotational speed of the first fan 21 is increased.

If the determination in step S38 is YES, then the method proceeds to step S39, wherein the rotational speed of the first fan 21 is decreased by the prescribed number of rotations. The method determines the range of decrease of the rotational speeds of the first motor 31 and the second motor 32 based on the load state of the first fan 21, and therefore the overload is eliminated early. Here, to prevent any excessive decrease in airflow, the range of decrease of the rotational speed of the first motor 31, which is not overloaded, is restricted as much as possible, and therefore the range of decrease of the rotational speed of the first motor 31 and the range of decrease of the rotational speed of the second motor 32 are different values.

If the determination in step S38 is NO, then the method proceeds to step S40, wherein the rotational speed of the first fan 21 is increased by the prescribed number of rotations, which supplements the reduced airflow. The range of increase of the rotational speed of the first motor 31 is determined based on the range of decrease of the rotational speed of the second motor 32 and the sum of the airflows demanded of the first fan 21 and the second fan 22, which prevents any excessive decrease in airflow.

In fan overload avoidance control according to the third embodiment as described above, the prescribed rotational speeds that can oppose the dynamic pressure on the suction side of the adjacent fan are preset; furthermore, to avoid an overload, the microcomputer 40 decreases the rotational speed of the fan that has become overloaded and, while doing so, increases the rotational speed of the adjacent fan if, even after decreasing its rotational speed, its rotational speed nevertheless exceeds the prescribed rotational speed; thereby, the reduced airflow is supplemented. Moreover, if the reduction in rotational speed causes the rotational speed to fall below the prescribed rotational speed, then the rotational speed of the adjacent fan is decreased.

<Features of the Third Embodiment>

In this fan control system, if the system transitions to the state wherein the rotational speed of the first motor 31 must be decreased because of an overload, then the control unit 4 decreases the rotational speed of the first motor 31; furthermore, when the rotational speed of the first motor 31, whose rotational speed has been decreased, is lower than its prescribed rotational speed, the rotational speed of the second motor 32 is decreased; in addition, when the rotational speed of the first motor 31, whose rotational speed has been decreased, is higher than its prescribed rotational speed, the rotational speed of the second motor 32 is increased. In other words, if the rotational speed of the first fan 21 is lower than its prescribed rotational speed, it is no longer possible to counter the dynamic pressure on the suction side of the second fan 22, and therefore the rotational speed of the second fan 22 is decreased, which lowers the dynamic pressure on the suction side thereof. Moreover, if the rotational speed of the first fan 21 is higher than its prescribed rotational speed, then there is margin enough to rotate against the dynamic pressure on the suction side of the second fan 22; therefore, the rotational speed of the second fan 22 is increased, which in turn supplements any decrease in airflow owing to the decrease in rotational speed of the first fan 21.

Similarly, if the system transitions to the state wherein the rotational speed of the second motor 32 must be decreased because of an overload, then the control unit 4 decreases the rotational speed of the second motor 32; furthermore, when the rotational speed of the second motor 32, whose rotational speed has been decreased, is lower than its prescribed rotational speed, the rotational speed of the first motor 31 is decreased; in addition, when the rotational speed of the second motor 32, whose rotational speed has been decreased, is higher than its prescribed rotational speed, the rotational speed of the first motor 31 is increased. In other words, if the rotational speed of the second fan 22 is lower than its prescribed rotational speed, it is no longer possible to counter the dynamic pressure on the suction side of the first fan 21, and therefore the rotational speed of the first fan 21 is decreased, which lowers the dynamic pressure on the suction side thereof. Moreover, if the rotational speed of the second fan 22 is higher than its prescribed rotational speed, then there is margin enough to rotate against the dynamic pressure on the suction side of the first fan 21; therefore, the rotational speed of the first fan 21 is increased, which in turn supplements any decrease in airflow owing to the decrease in rotational speed of the second fan 22.

The first embodiment, the second embodiment, and the third embodiment explained exemplary cases wherein two fans are installed in the same air passageway, but the number of fans is not limited to two; rather, even in the case wherein there are numerous fans, all of the fans can be appropriately controlled by performing similar control.

INDUSTRIAL APPLICABILITY

According to the present invention as described above, when at least one fan of a plurality of adjacent fans becomes overloaded, it is possible to eliminate the overload without stopping that fan, which is useful in, for example, air conditioners and fan filter units that control a plurality of fans.

What is claimed is:

1. A fan control system comprising:
a first fan;
a second fan adjacent to the first fan;
a first motor configured to rotate the first fan;
a second motor configured to rotate the second fan; and
a control unit configured to control rotational speeds of the first motor and the second motor,
the control unit being configured to detect an abnormality in the first motor,
the control unit stopping both operation of the first motor and operation of the second motor in response to the abnormality being detected by the control unit,
the control unit including
inverter circuits configured to control rotational speeds of the first motor and the second motor to stop the operation of the first motor and the operation of the second motor in response to the abnormality being detected by the control unit, and
drive circuits configured to input drive signals to the inverter circuits,
the control unit being configured to input the drive signals to the inverter circuits such that the first motor and the second motor reach respective prescribed rotational speeds via the drive circuits.

2. The fan control system according to claim 1, wherein the abnormality is a mechanical overload, and
when the mechanical overload occurs in the first motor, the control unit stops both operation of the first motor and operation of the second motor such that the first fan neither rotates in reverse or receives a load in a reverse rotational direction owing to dynamic pressure on a suction side of the second fan.

3. The fan control system according to claim 2, wherein after the operation of the first motor and the operation of the second motor have been stopped, the control unit starts startup operations of the first motor and the second motor simultaneously, and
the startup operations are started after rotation of the first motor and rotation of the second motor have stopped.

4. The fan control system according to claim 2, wherein the startup operations are started after the rotational speeds of the first motor and the second motor have fallen below a prescribed rotational speed.

5. The fan control system according to claim 4, wherein the prescribed rotational speed is set to a rotational speed at which the first motor and the second motor do not stop abnormally when they are started up.

6. The fan control system according to claim 2, wherein the startup operations are started after standing by for prescribed times after the operation of the first motor and the operation of the second motor have been stopped.

7. The fan control system according to claim 6, wherein the prescribed times are set to times at which the first motor and the second motor do not stop abnormally when they are started up.

8. The fan control system according to claim 1, wherein the abnormality is a mechanical overload, and
the control unit detects the mechanical overload in the first motor by detecting that the first fan has stopped.

9. An air conditioner, comprising:
a fan control system according to claim 1.

* * * * *